(12) United States Patent
Follero et al.

(10) Patent No.: US 11,502,835 B2
(45) Date of Patent: Nov. 15, 2022

(54) METHOD AND DEVICE FOR ELLIPTIC CURVE COMPUTATIONS BY LOW RESOURCE DEVICES

(71) Applicant: STMicroelectronics S.r.l., Agrate Brianza (IT)

(72) Inventors: Giulio Follero, Pozzuoli (IT); Rosario Bosco, Portici (IT)

(73) Assignee: STMicroelectronics S.r.l., Agrate Brianza (IT)

(*) Notice: Subject to any disclaimer, the term of this patent is extended or adjusted under 35 U.S.C. 154(b) by 260 days.

(21) Appl. No.: 16/890,801

(22) Filed: Jun. 2, 2020

(65) Prior Publication Data
US 2020/0389308 A1    Dec. 10, 2020

(51) Int. Cl.
| H04L 9/30 | (2006.01) |
| G06F 7/72 | (2006.01) |
| G06F 17/11 | (2006.01) |

(52) U.S. Cl.
CPC ............ H04L 9/3066 (2013.01); G06F 7/725 (2013.01); G06F 17/11 (2013.01)

(58) Field of Classification Search
CPC ............... H04L 9/3066; H04L 2209/08; H04L 2209/76; H04L 9/0841; G06F 7/725; G06F 17/11; G09C 1/00
See application file for complete search history.

(56) References Cited

U.S. PATENT DOCUMENTS

| 2002/0108041 | A1  | 8/2002  | Watanabe et al. |          |
|--------------|-----|---------|-----------------|----------|
| 2010/0166174 | A1* | 7/2010  | Ghouti          | H04L 9/3066 380/28 |
| 2011/0200186 | A1* | 8/2011  | Ghouti          | H04L 9/0637 380/43 |
| 2011/0200188 | A1* | 8/2011  | Ghouti          | H04L 9/0637 380/43 |
| 2012/0237030 | A1* | 9/2012  | Ghouti          | H04L 9/3066 380/255 |
| 2019/0081786 | A1* | 3/2019  | Loiseau         | H04L 9/3066 |
| 2020/0389308 | A1* | 12/2020 | Follero         | G06F 7/725 |
| 2021/0083853 | A1* | 3/2021  | Okano           | H04L 9/0662 |

FOREIGN PATENT DOCUMENTS

EP    3232603 A1    10/2017

OTHER PUBLICATIONS

Englert, B., et al., "Twisting an elliptic curve to speed up cryptographic algorithms", Jan. 1, 2006, 9 pages.
Valenta, L., et al., "In Search of CurveSwap: Measuring Elliptic Curve Implementations in the wild", 2018 IEEE European Symposium on Security and Privacy (EUROS&P), IEEE, Apr. 24, 2018. 15 pages.

* cited by examiner

*Primary Examiner* — Beemnet W Dada
(74) *Attorney, Agent, or Firm* — Slater Matsil, LLP

(57) ABSTRACT

The present disclosure relates to a method and device for performing an elliptic curve cryptography computation comprising: twisting, by a first device based on a first index of quadratic or higher order twist (d), a first point (P'KB) on a first elliptic curve over a further elliptic curve twisted with respect to the first elliptic curve to generate a twisted key (PKB); transmitting the twisted key (PKB) to a further device; receiving, from the further device, a return value (ShS) generated based on the twisted key (PKB); and twisting, by the first device based on the first index of quadratic or higher order twist (d), the return value (ShS) over the first elliptic curve to generate a result (ShS') of the ECC computation.

21 Claims, 2 Drawing Sheets

METHOD AND DEVICE FOR ELLIPTIC CURVE COMPUTATIONS BY LOW RESOURCE DEVICES

CROSS-REFERENCE TO RELATED APPLICATIONS

This application claims the priority benefit of French patent application number 19/06089, filed on Jun. 7, 2019, the content of which is hereby incorporated herein by reference in its entirety to the maximum extent allowable by law.

TECHNICAL FIELD

The present disclosure relates generally to the field of cryptography, and in particular to a method and device for performing elliptic curve cryptography.

BACKGROUND

Elliptic curve cryptography (ECC) is used for a variety of cryptographic tasks, including for key generation/agreement and signature generation and verification. An advantage of ECC over non-elliptic curve cryptography is that a far smaller key can provide equivalent security.

However, such ECC tasks generally involve relatively complex computations, which, for computational efficiency, are generally performed by a dedicated cryptographic coprocessor.

In some applications, it would be desirable to allow devices with relatively low levels of processing resources, and in particular devices that do not include a dedicated cryptographic coprocessor, to benefit from the advantages of ECC. However, there are technical difficulties in providing such a solution while maintaining security among the actors involved in the system.

SUMMARY

According to one aspect, there is provided a method of performing an elliptic curve cryptography computation comprising: twisting, by a first device based on a first index of quadratic or higher order twist, a first point on a first elliptic curve over a further elliptic curve twisted with respect to the first elliptic curve to generate a twisted key; transmitting the twisted key to a further device; receiving, from the further device, a return value generated based on the twisted key; and twisting, by the first device based on the first index of quadratic or higher order twist, the return value over the first elliptic curve to generate a result of the ECC computation.

According to one embodiment, the first variable is not communicated to the further device.

According to one embodiment, the first point on the first elliptic curve is a public key of a second device.

According to one embodiment, the return value is a point on the further elliptic curve.

According to one embodiment, the first point on the first elliptic curve is a point of the further elliptic curve that has been twisted over the first elliptic curve based on the first index of quadratic or higher order twist.

According to one embodiment, the further elliptic curve is of the form:

$$y^2 = x^3 + a_2 x^2 + a_4 x + a_6 \qquad \text{[Math 1]}$$

where $a_2$, $a_4$ and $a_6$ are elements of a finite field over which the further elliptic curve is defined, and wherein the first elliptic curve is defined over an extension of the finite field, the first elliptic curve being isomorphic to the further elliptic curve over an algebraic closure of the finite field.

According to one embodiment, the first elliptic curve is of the form:

$$y^2 = x^3 + d a_2 x^2 + d^2 a_4 x + d^3 a_6 \qquad \text{[Math 2]}$$

where d is the index of quadratic or higher order twist, which is a non-zero element of the finite field.

According to one embodiment, the further elliptic curve is of the form:

$$y^2 = x^3 + ax + b \pmod{p} \qquad \text{[Math 3]}$$

where the coefficients a and b are elements of the finite field $F_P$, and where:

$$4a^3 + 27b^2 \neq 0 \pmod{p} \qquad \text{[Math 4]}$$

According to one embodiment, the first elliptic curve is of the form:

$$y'^2 = x'^3 + a'x' + b' \pmod{p} \qquad \text{[Math 5]}$$

where $$x' = \frac{x}{d^2}, \qquad \text{[Math 6]}$$

$$y' = \frac{y}{d^3},$$

$$a' = \frac{a}{d^4},$$

$$b' = \frac{b}{d^6},$$

for $d \in F_p^* := F_p - \{0\}$

According to one embodiment, twisting the first point on the first elliptic curve over the further elliptic curve involves determining a point H, corresponding to the first point, as follows:

$$H=(x,y) \text{ where } x=x'd^2, y=y'd^3 \text{ for } d \in F_p^* := F_p - \{0\} \qquad \text{[Math 7]}$$

According to a further aspect, there is provided a method of generating a shared secret between first and second devices comprising: —implementing the above method, wherein the twisted key is transmitted to the further device along with a private key, the return value corresponding to the shared secret.

According to one embodiment, the method further comprises, prior to twisting the first point on the first elliptic curve, transmitting to a second device the index of quadratic or higher order twist, wherein the first point on the first elliptic curve corresponds to an original public key of the second device twisted over the first elliptic curve based on the index of quadratic or higher order twist.

According to one embodiment, the method further comprises, prior to twisting the first point on the first elliptic curve: twisting, by the first device based on the index of quadratic or higher order twist, a further point over the first elliptic curve to generate a public key of the first device; and transmitting the public key of the first device to the second device.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. For example, techniques for key agreement based on ECC, involving the computation of a shared secret based on a private key and on the public key of a third party, are well known by those skilled in the art and will not be described in detail.

Unless indicated otherwise, when reference is made to two elements connected together, this signifies a direct connection without any intermediate elements other than conductors, and when reference is made to two elements linked or coupled together, this signifies that these two elements can be connected or they can be linked or coupled via one or more other elements.

Unless specified otherwise, the expressions "around", "approximately", "substantially" and "in the order of" signify within 10%, and preferably within 5%.

Figure 1:
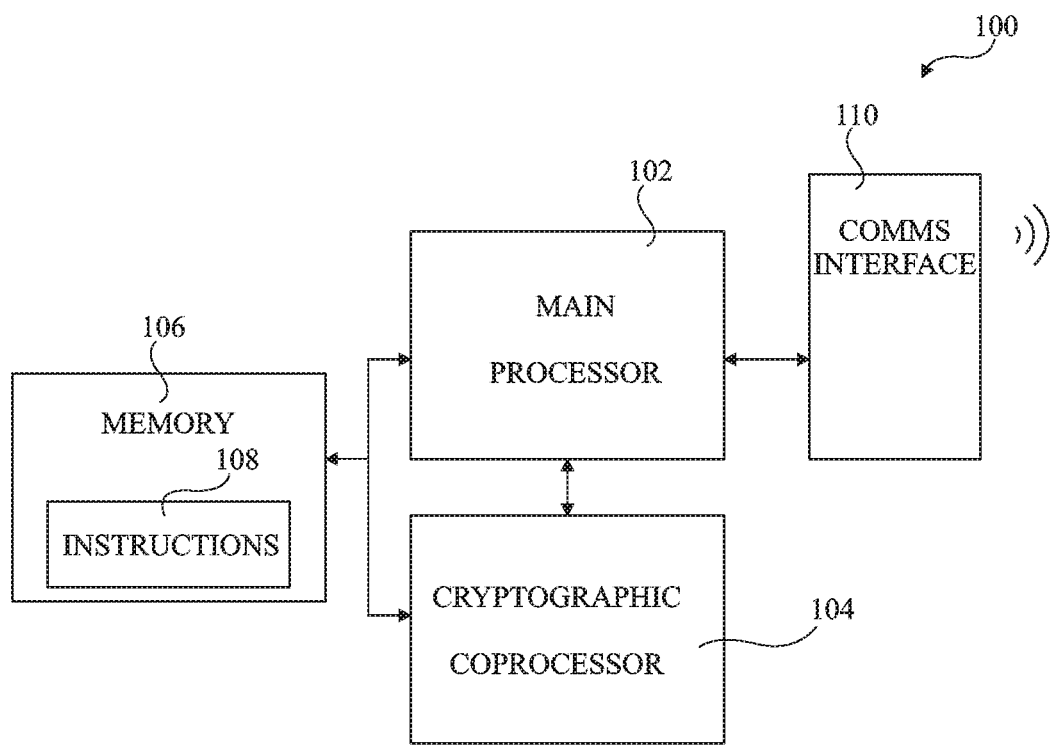
FIG. 1 schematically illustrates a device with cryptographic coprocessor according to an example embodiment.

FIG. 1 schematically illustrates a device 100 configured for performing ECC computations according to an example embodiment.

The device 100 for example comprises a main processor 102, which is for example a host processor of the device 100, and a cryptographic coprocessor 104. The device 100 further comprises a memory 106 storing instructions 108 for controlling the main processor 102 and coprocessor 104. A communications interface no is for example coupled to the main processor 102, and for example permits wireless communications via a wireless communications network, and/or wired communications, for example over a LAN (Local Area Network—not illustrated).

The device 100, and in particular the cryptographic coprocessor 104, is for example capable of performing ECC computations such as generating a shared secret, for example based on ECDH (Elliptic Curve Diffie-Hellman) and/or a cryptographic signature generation and/or verification, for example based on ECDSA (Elliptic Curve Digital Signature Algorithm).

Figure 2:
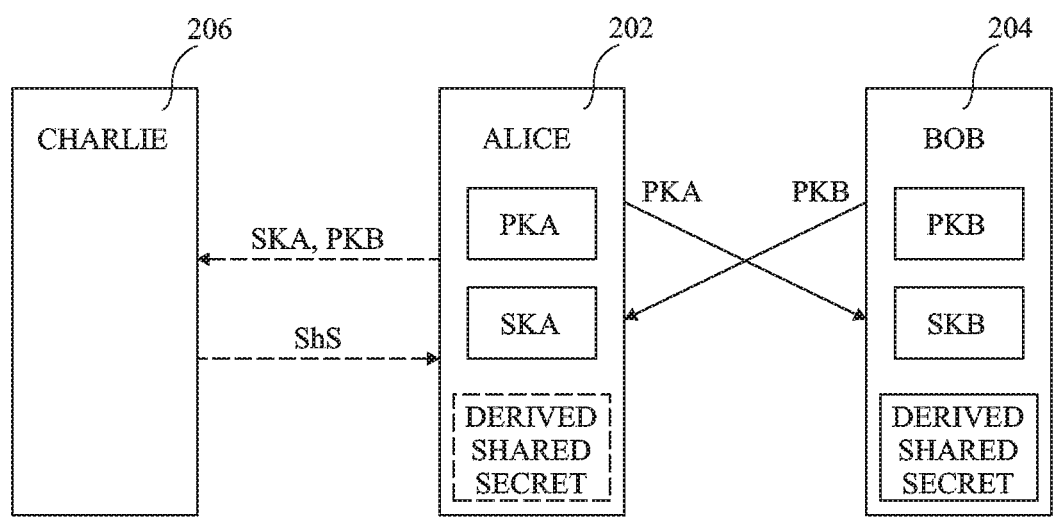
FIG. 2 schematically illustrates a system in which an ECC computation is performed according to a non-optimal approach.

FIG. 2 schematically illustrates a system 200 in which a cryptographic task, and in particular an ECC computation, is executed according to a non-optimal approach.

FIG. 2 illustrates three devices 202, 204, 206, corresponding respectively to parties ALICE, BOB and CHARLIE Charlie and Bob's devices 204 and 206 are for example devices similar or identical to the device 100 of FIG. 1, and are thus capable of executing ECC computations. Alice's device 202 is, however, a device having relatively low computational resources. For example, this device 202 is similar to the device 100 of FIG. 1 in that it comprises the main processor 102, memory 106 and communications interface 110, but it does not have a cryptographic coprocessor 104.

In some embodiments, the device 202 could be an embedded secure element forming part of a mobile communications device and having no integrated cryptographic coprocessor. For example, the device 202 could be an eUICC (embedded Universal Integrated Circuit Card). Alternatively, the device 202 could form part of a mobile IoT (Internet of Things) device, such as a sensor or the like. ECC computations using the device 202, such as key generation/agreement, ECDH, and signature generation/verification, are for example inefficient in terms of processing time and power, or even impossible to implement.

Alice and Bob each have a corresponding public/private key pair, in particular the public key PKA and private key SKA in the case of Alice, and the public key PKB and private key SKB in the case of Bob. They for example wish to establish a shared secret ShS, which can be used, for example, to establish a key for symmetric encryption.

Alice and Bob exchange their public keys PKA, PKB. Bob is thus able to derive a shared secret based on his private key SKB and Alice's public key PKA. However, Alice does not have processing resources permitting her to derive, in an efficient manner, the same shared secret based on her private key SKA and Bob's public key PKB.

A solution could be for Alice to rely on a third party, Charlie, to compute the shared secret ShS. Charlies is for example a trusted entity for Alice, and therefore Alice for example transmits to Charlie her private key SKA. However, if Alice also transmits to Charlie the public key PKB of Bob, then, from Bob's viewpoint, the security would be compromised, as Charlie would know Alice's public/private key pair. This situation is therefore non-optimal for cases in which Charlie is not a trusted third party for Bob. Furthermore, each of the actors Alice and Bob should have one, and only one, secret key SKA, SKB associated with their public key.

Figure 3:
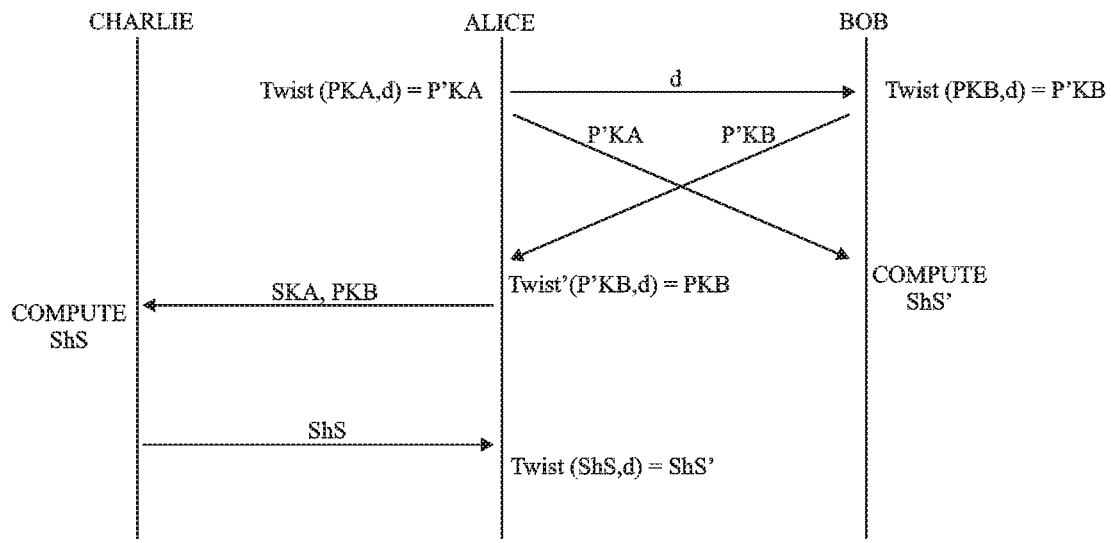
FIG. 3 illustrates the execution of an ECC computation according to an example embodiment of the present disclosure.

FIG. 3 illustrates a method of executing a cryptographic task according to an example embodiment of the present disclosure.

As with the example of FIG. 2, the method of FIG. 3 for example involves an exchange of public keys between Alice and Bob, without sharing their private keys. However, rather than Alice and Bob exchanging their original public keys PKA, PKB, in the example of FIG. 4, Alice and Bob exchange twisted public keys P'KA, P'KB, that are generated based on a quadratic or higher order twist. For example, Alice applies a function Twist(PKA,d) to generate a twisted public key P'KA, and Bob applies a function Twist(PKB,d) to generate a twisted public key P'KB. In some embodiments, the parameter d is generated by Alice, for example randomly or pseudo randomly, and transmitted to Bob so that Bob can apply the same quadratic or higher order twist as Alice. In alternative embodiments, the parameter d could be generated by Bob, for example randomly or pseudo randomly, and transmitted to Alice so that Alice can apply the same quadratic or higher order twist as Bob.

As known by those skilled in the art, an ECC method applied between Alice and Bob for example involves defining a common elliptic curve E defined over a finite field $F_p$, wherein p is a prime number specifying the size of the finite field. The elliptic curve E for example has the form (eq. 1):

$$y^2 = x^3 + a_2 x^2 + a_4 x + a_6 \pmod{p} \quad \text{[Math 8]}$$

where the coefficients $a_2$, $a_4$ and $a_6$ are elements of the finite field $F_P$. In the case of the short Weierstrass form, the elliptic curve E for example has the form (eq. 2):

$$y^2 = x^3 + ax + b \pmod{p} \quad \text{[Math 9]}$$

where the coefficients a and b are elements of the finite field $F_P$, where:

$$4a^3 + 27b^2 \neq 0 \pmod{p} \quad \text{[Math 10]}$$

However, the Weierstrass and short Weierstrass forms are merely two examples of ways of describing the curve. Those skilled in the art will understand that there are many other forms for writing an elliptic curve, e.g. the Legendre form, and the embodiments described herein are not limited to any particular form.

As also known by those skilled in the art, an elliptic curve E can be defined by the following parameters:
the prime p specifying the size of the finite field;
the coefficients of the elliptic curve equation, such as the coefficients $a_2$, $a_4$ and $a_6$ of the equation eq. 1 above, or the coefficients a and b of the equation eq. 2 above;
a base point G on the curve that generates the selected subgroup;
the order n of the subgroup; and
the cofactor h of the subgroup.

The private keys SKA, SKB of Alice and Bob each for example correspond to a random integer r chosen from the group $\{1, \ldots, n-1\}$, where n is the order of the subgroup.

The original public keys PKA, PKB for example correspond to points H=(x,y)=rG on the curve, where G is the base point of the subgroup, and rG corresponds to a scalar multiplication of r and G, modulo p.

Twisting an elliptic curve E corresponds for example to a rotation of the elliptic curve E, resulting in another curve E', which is isomorphic to E over the algebraic closure of $F_p$.

As an example, the quadratic twist of the curve of eq. 1 above could be as follows:

$$y^2 = x^3 + da_2 x^2 + d^2 a_4 x + d^3 a_6 \pmod{p} \quad \text{[Math 11]}$$

defined over the extension:

$$F_p(\sqrt{d}) \quad \text{[Math 12]}$$

of the field $F_p$.

In the case that the elliptic curve E has the short Weierstrass form, applying a quadratic twist to a public key based on a variable d for example involves a substitution of x and y by x' and y' respectively such that the curve becomes:

$$y'^2 = x^3 + a'x' + b' \pmod{p} \quad \text{[Math 13]}$$

where (eqs. 3)

$$x' = \frac{x}{d^2}, \quad \text{[Math 14]}$$
$$y' = \frac{y}{d^3},$$
$$a' = \frac{a}{d^4},$$
$$b' = \frac{b}{d^6},$$
$$\text{for } d \in F_p^* := F_p - \{0\}$$

The equations eqs. 3 above can for example be found in section 2.1 of the publication entitled "Twisting an elliptic curve to speed up cryptographic algorithms", by Burkhard Englert, Darin Goldstein and Will Murray (2005), the contents of which is hereby incorporated by reference to the extent permitted by the law.

Thus, applying a quadratic twist to a public key based on a parameter d corresponds to twisting a point H=(x,y) on the original elliptic curve E over a further curve that is twisted based on an index of quadratic twist d. The equations that convert the original point H=(x,y) to the twisted value H' are then as follows:

$$H' = (x', y') \quad \text{[Math 15]}$$
$$\text{where } x' = \frac{x}{d^2},$$
$$y' = \frac{y}{d^3}$$
$$\text{for } d \in F_p^* := F_p - \{0\}$$

Referring again to FIG. 3, Bob is for example able to compute a shared secret ShS' based on Alice's twisted public key P'KA and his private key SKB. In some embodiments, this involves a scalar multiplication $r_B H_A'$, where $r_B$ is the random integer corresponding to Charlie's private key, and $H_A'$ is the point on the twisted elliptic curve E' corresponding to Alice's public key. The shared secret ShS' is thus for example a point on the twisted elliptic curve E'.

Alice for example relies on Charlie for part of the generation of the shared secret. Before doing so, Alice for example twists the public key P'KB, provided by Bob, over the untwisted elliptic curve E. For example, this involves applying a function Twist'(P'KB,d) to Bob's public key P'KB, where this twisting operation is for example the reverse of the operation applied by Bob to his original public key PKB, and thus results in regenerating Bob's original public key PKB.

An example of the equations that convert the twisted point H' back to the original point H is:

$$H = (x, y) \text{ where } x = x'd^2, y = y'd^3 \text{ for } d \in F_p^* := F_p - \{0\} \quad \text{[Math 16]}$$

Alice then for example transmits Bob's public key PKB, and her private key SKA, to the device 206 of Charlie. In some embodiments, Alice and Bob have a pre-shared further key, based on which they are able to communicate over a secure channel using symmetric or asymmetric cryptography. However, Charlie is not a trusted actor for Bob, and so Bob and Charlie do not for example exchange information without passing via Alice.

Charlie is then for example able to compute a shared secret ShS based on Bob's public key PKB and Alice's private key SKA. In some embodiments, this involves a scalar multiplication $r_A H_B$, where $r_A$ is the random integer corresponding to Alice's private key, and $H_B$ is the point on the untwisted elliptic curve E corresponding to Bob's public key.

Alice then for example receives the shared secret ShS, and computes the shared secret ShS' by twisting the value ShS over the twisted elliptic curve E'. For example, this involves applying a function Twist(ShS,d) to the result ShS.

Figure 4:
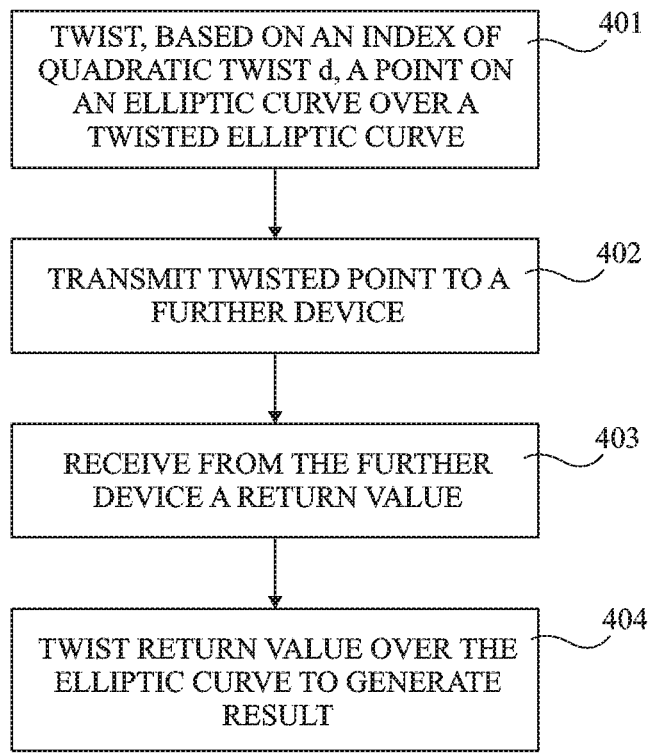
FIG. 4 is a flow diagram illustrating operations in a method of implementing an ECC computation according to an example embodiment of the present disclosure.

FIG. 4 is a flow diagram illustrating operations in a method of executing a cryptographic task according to an example embodiment of the present disclosure. This method is for example implemented by the main processor 102 of the device 202 of FIG. 2.

In an operation 401 of FIG. 4, the device 202 twists a point on a shared elliptic curve over a twisted elliptic curve based on an index of quadratic or higher order twist d. The shared elliptic curve is the elliptic curve based on which public keys have been generated and exchanged. For example, in the embodiment of FIG. 3, the shared elliptic curve is the twisted curve E', and the device 202 of Alice receives the public key P'KB of Bob corresponding to a point on the curve E', and twists this point over the elliptic curve E. Just as the curve E' can be said to be twisted with respect to the curve E, the inverse is also true, the curve E being twisted with respect to the curve E' based on the index d.

In an operation 402, the twisted point is transmitted to a further device, such as to the device 206 of Charlie. In some cases, the communications between Alice and Charlie are at least partially via a wireless network, although in alternative embodiments the communications could be entirely over one or more wired connections. The further device 206 is capable of performing ECC computations, and for example generates the shared secret ShS in the embodiment of FIG. 3.

In an operation 403, the device 202 of Alice receives a return value from the further device 206, corresponding to the shared secret ShS in the embodiment of FIG. 3. This return value for example corresponds to a point on the "twisted" curve E.

In an operation 404, the device 202 of Alice twists the return value over the shared elliptic curve to generate the result of the ECC computation. For example, in some embodiments, the result is a secret shared between Alice and Bob corresponding to a point on the shared twisted elliptic curve. This shared secret can for example be used as a basis for symmetric encryption between Alice and Bob. For example, the x coordinate of the point corresponding to the shared secret can be used as the secret key for the symmetric encryption, or the secret key for the symmetric encryption can be derived based, in part, on this x coordinate.

An advantage of the embodiments described herein is that the index d of quadratic or higher order twist is used as a further secret not known to Charlie, and thus enables Alice to delegate part of the ECC computation to Charlie without disclosing the public key/private key pair used between Alice and Bob. In the embodiment of FIG. 3, the index d becomes a shared secret between Alice and Bob.

Various embodiments and variants have been described. Those skilled in the art will understand that certain features of these embodiments can be combined and other variants will readily occur to those skilled in the art. For example, while some specific examples of quadratic twists have been described, it will be apparent to those skilled in the art that there are other types of quadratic twist that could be employed. Furthermore, it will be apparent to those skilled in the art that high order twists could also be used, such as cubic or quartic twists. Indeed, any linear twist transformation that preserves the group operation can for example be used.

Furthermore, while embodiments relating to key agreement have been described, it will be apparent to those skilled in the art that the principles described herein could be applied to any ECC computations based on one or more points of an elliptic curve.

Finally, the practical implementation of the embodiments and variants described herein is within the capabilities of those skilled in the art based on the functional description provided hereinabove. For example, the implementation of operations such as point addition and scalar multiplication in the field of ECC are well known to those skilled in the art.

What is claimed is:

1. A method of performing an elliptic curve cryptography (ECC) computation comprising:
    twisting, by a first device based on a first index of quadratic or higher order twist, a first point on a first elliptic curve over a further elliptic curve twisted with respect to the first elliptic curve, to generate a twisted key;
    transmitting the twisted key to a further device;
    receiving, from the further device, a return value generated based on the twisted key; and
    twisting, by the first device based on the first index of quadratic or higher order twist, the return value over the first elliptic curve to generate a result of the ECC computation.

2. The method of claim 1, wherein the first index is not communicated to the further device.

3. The method of claim 1, wherein the first point on the first elliptic curve is a public key of a second device.

4. The method of claim 1, wherein the return value is a point on the further elliptic curve.

5. The method of claim 1, wherein the first point on the first elliptic curve is a point of the further elliptic curve that has been twisted over the first elliptic curve based on the first index of quadratic or higher order twist.

6. The method of claim 5, wherein the further elliptic curve is represented by:

$$y^2 = x^3 + a_2 x^2 + a_4 x + a_6$$

where $a_2$, $a_4$ and $a_6$ are elements of a finite field ($F_p$) over which the further elliptic curve is defined, and wherein the first elliptic curve is defined over an extension of the finite field ($F_p$), the first elliptic curve being isomorphic to the further elliptic curve over an algebraic closure of the finite field ($F_p$).

7. The method of claim 6, wherein the first elliptic curve is represented by:

$$y^2 = x^3 + d a_2 x^2 + d^2 a_4 x + d^3 a_6,$$

where d is the first index of quadratic or higher order twist, which is a non-zero element of the finite field ($F_p$).

8. The method of claim 5, wherein the further elliptic curve is represented by:

$$y^2 = x^3 + ax + b \pmod{p}$$

where coefficients a and b are elements of a finite field ($F_P$), and where:

$$4a^3 + 27b^2 \neq 0 \pmod{p}.$$

9. The method of claim 8, wherein the first elliptic curve is represented by:

$$y'^2 = x'^3 + a'x' + b' \pmod{p},$$
where
$$x' = \frac{x}{d^2},$$
$$y' = \frac{y}{d^3},$$
$$a' = \frac{a}{d^4},$$
$$b' = \frac{b}{d^6},$$
for $d \in F_p^* := F_p - \{0\}$.

10. The method of claim 9, wherein twisting the first point on the first elliptic curve over the further elliptic curve comprises determining a point H, corresponding to the first point, as follows:

$$H=(x,y) \text{ where } x=x'd^2, y=y'd^3 \text{ for } d\in F_p^* := F_p - \{0\}.$$

11. The method of claim 1, further comprising transmitting the twisted key and a private key to the further device, the return value corresponding to a shared secret between the first device and a second device.

12. The method of claim 11, further comprising, prior to twisting the first point on the first elliptic curve:
transmitting, to the second device, the first index of quadratic or higher order twist,
the first point on the first elliptic curve corresponding to an original public key of the second device twisted over the first elliptic curve based on the first index of quadratic or higher order twist.

13. The method of claim 12, further comprising, prior to twisting the first point on the first elliptic curve:
twisting, by the first device based on the first index of quadratic or higher order twist, a further point over the first elliptic curve to generate a public key of the first device; and
transmitting the public key of the first device to the second device.

14. A first device configured to perform an elliptic curve cryptography (ECC) computation, the first device comprising:
a memory comprising instructions; and
a processor in communication with the memory, wherein the processor executes the instructions to:
twist, based on a first index of quadratic or higher order twist, a first point on a first elliptic curve over a further elliptic curve twisted with respect to the first elliptic curve, to generate a twisted key;
transmit the twisted key to a further device;
receive, from the further device, a return value generated based on the twisted key; and
twist, based on the first index of quadratic or higher order twist, the return value over the first elliptic curve to generate a result of the ECC computation.

15. The first device of claim 14, wherein the first index is not communicated to the further device.

16. The first device of claim 14, wherein the first point on the first elliptic curve is a public key of a second device.

17. The first device of claim 14, wherein the return value is a point on the further elliptic curve.

18. The first device of claim 14, wherein the first point on the first elliptic curve is a point of the further elliptic curve that has been twisted over the first elliptic curve based on the first index of quadratic or higher order twist.

19. The first device of claim 14, wherein the processor executes the instructions to transmit the twisted key and a private key to the further device, wherein the return value corresponds to a shared secret between the first device and a second device.

20. The first device of claim 19, wherein, prior to twisting the first point on the first elliptic curve, the processor executes the instructions to:
transmit, to the second device, the first index of quadratic or higher order twist,
wherein the first point on the first elliptic curve corresponds to an original public key of the second device twisted over the first elliptic curve based on the first index of quadratic or higher order twist.

21. The first device of claim 20, wherein, prior to twisting the first point on the first elliptic curve, the processor executes the instructions to:
twist, based on the first index of quadratic or higher order twist, a further point over the first elliptic curve to generate a public key of the first device; and
transmit the public key of the first device to the second device.

* * * * *